United States Patent [19]
Chun et al.

[11] Patent Number: 5,522,002
[45] Date of Patent: May 28, 1996

[54] METHOD FOR MAKING OPTICAL INTERFACE UNIT WITH DETACHABLE PHOTONIC DEVICE

[75] Inventors: Christopher K. Y. Chun, Gilbert; Shun-Meen Kuo; Gary F. Witting, both of Chandler, all of Ariz.

[73] Assignee: Motorola, Schaumburg, Ill.

[21] Appl. No.: 370,692

[22] Filed: Jan. 10, 1995

Related U.S. Application Data

[62] Division of Ser. No. 147,510, Nov. 5, 1993, abandoned.

[51] Int. Cl.$^6$ .................................................. G02B 6/42
[52] U.S. Cl. ............................ 385/88; 385/92; 257/433
[58] Field of Search ............................ 385/88, 89, 31, 385/14, 28, 52, 76, 90, 91, 92, 126, 130, 132; 257/433, 458, 698, 724; 437/51, 204, 206, 207, 249

[56] References Cited

U.S. PATENT DOCUMENTS

| | | | |
|---|---|---|---|
| 5,249,245 | 9/1993 | Lebby et al. | 385/89 |
| 5,265,184 | 11/1993 | Lebby et al. | 385/132 |
| 5,369,529 | 11/1994 | Kuo et al. | 385/130 |

*Primary Examiner*—John D. Lee
*Assistant Examiner*—Phan T. H. Palmer
*Attorney, Agent, or Firm*—Gary F. Witting

[57] ABSTRACT

A substrate having a photonic device mounted thereon with a working portion that is operably connected to at least one electrical lead. A molded optical portion having a surface for light signal to enter and to exit is formed that encapsulates the substrate, the photonic device, and a portion of the first and second electrical lead. An optical connector is formed to plug into the molded optical portion to connect a fiber bundle thereto and the optical portion is electrically connected to an interconnect module.

6 Claims, 4 Drawing Sheets

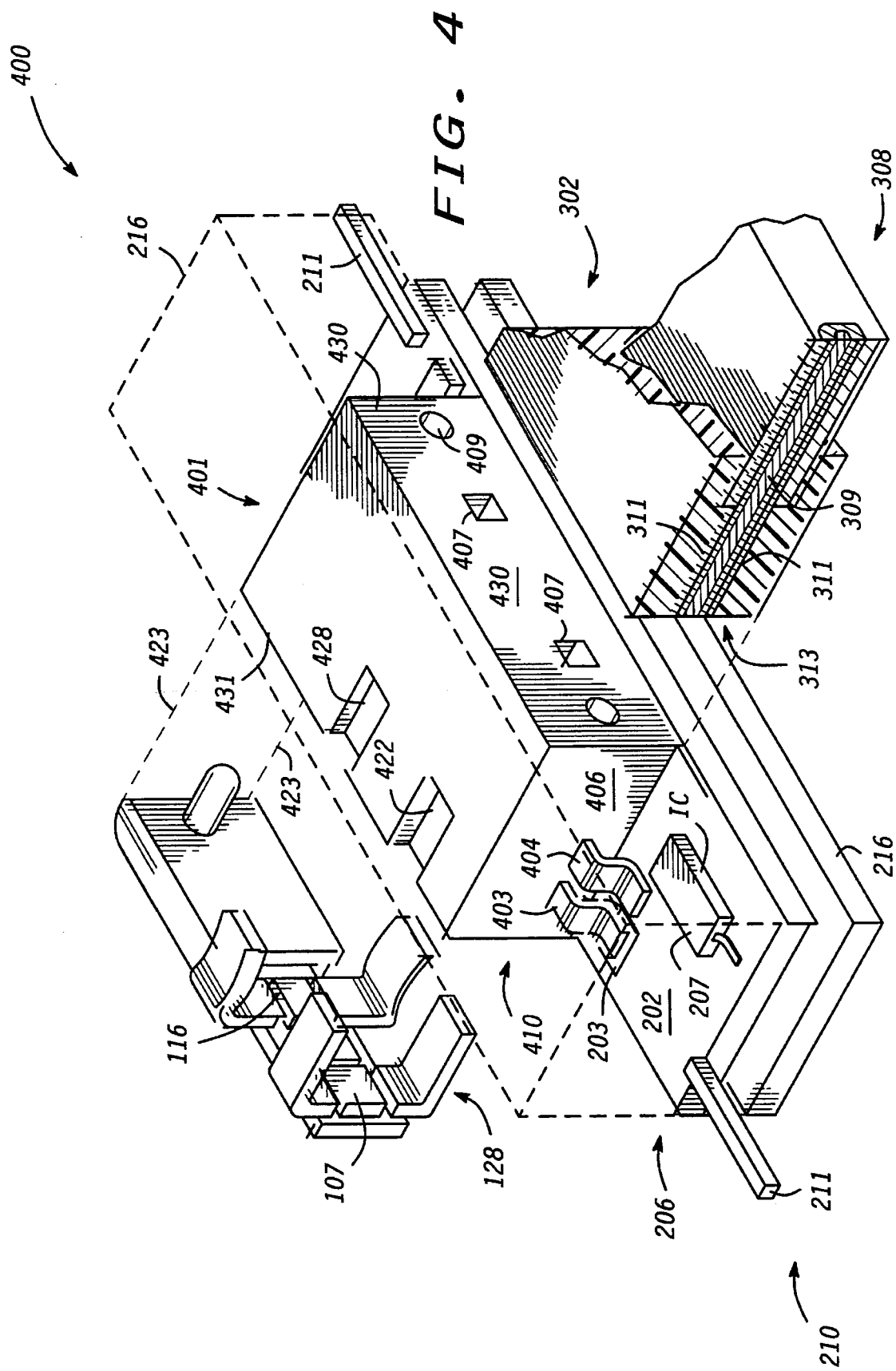

METHOD FOR MAKING OPTICAL INTERFACE UNIT WITH DETACHABLE PHOTONIC DEVICE

This is a division of application Ser. No. 08/147,510, filed Nov. 5, 1993 (abandoned).

BACKGROUND OF THE INVENTION

This invention relates, in general, to fabrication of optical devices and, more particularly, to manufacturing and fabrication of optical interface devices.

At present, optical interface devices are made using a variety of methods, such as photolithography, diffusion, ion implantation, or a combination of any of the methods mentioned above to manufacture components for optical interface devices. Generally, these methods used for manufacturing optical interface devices are complex, inefficient, and are generally not suitable for high volume manufacturing. Moreover, when the components of the optical interface device are assembled, the components are electrically and mechanically affixed together, thus not enabling replacement of individual components. With use of the optical interface device, the individual components, i.e., photonic devices fatigued and fail; however, the rest of the optical interface device is sound and usable, thus a need for a flexible structure that allows for a quick and an efficient replacement of the fatigue and the failed photonic devices will be required.

Further, conventional methods for manufacturing optical interface devices require individual processing that is typically achieved by hand. These processes that are achieved by hand inject many problems into conventional manufacturing, such as being extremely labor intensive, costly, inaccuracy of workmanship that results in the optical interface devices not being capable of being manufactured in high volumes. Moreover, individual fabrication of optical interface devices do not generally lend themselves to automated manufacturing, thus causing limited use of optical interface devices in conjunction with standard electronic components and standard electronic equipment sets.

It can be readily seen that conventional optical interface devices have severe limitations. Also, it is evident that these conventional optical interface devices are not only ineffective, expensive, and complex, but also do not lend themselves to high volume manufacturing environments. Therefore, a detachable optical interface unit or device that is flexible and manufacturable in an automated effective manner would be highly desirable.

SUMMARY OF THE INVENTION

Briefly stated, a detachable optical interface unit are provided. A substrate is provided. A photonic device having a first surface and a second surface is mounted on the substrate. The first surface of the photonic device has a working portion and the second surface of the photonic device is mounted on the substrate. A first electrical lead and a second electrical lead is operably connected to the photonic device. A molded optical portion has a surface for a light signal to enter and to exit. The molded optical portion also encapsulates the substrate, the photonic device, and a potion of the first and second electrical lead.

It is an advantage of the present invention to provide an efficient and quick method for replacing a photonic device or an array of photonic devices that are part of an optical interface system.

It is another advantage of the present invention to provide a new and improved optical interface system.

It is another advantage of the present invention to provide a new and improved optical repeating system.

BRIEF DESCRIPTION OF THE DRAWINGS

FIG. 4 is a enlarged simplified perspective view of another embodiment of an optical interconnect system incorporating the present invention, with a portion thereof removed.

DETAILED DESCRIPTION OF THE DRAWINGS

Figure 1:
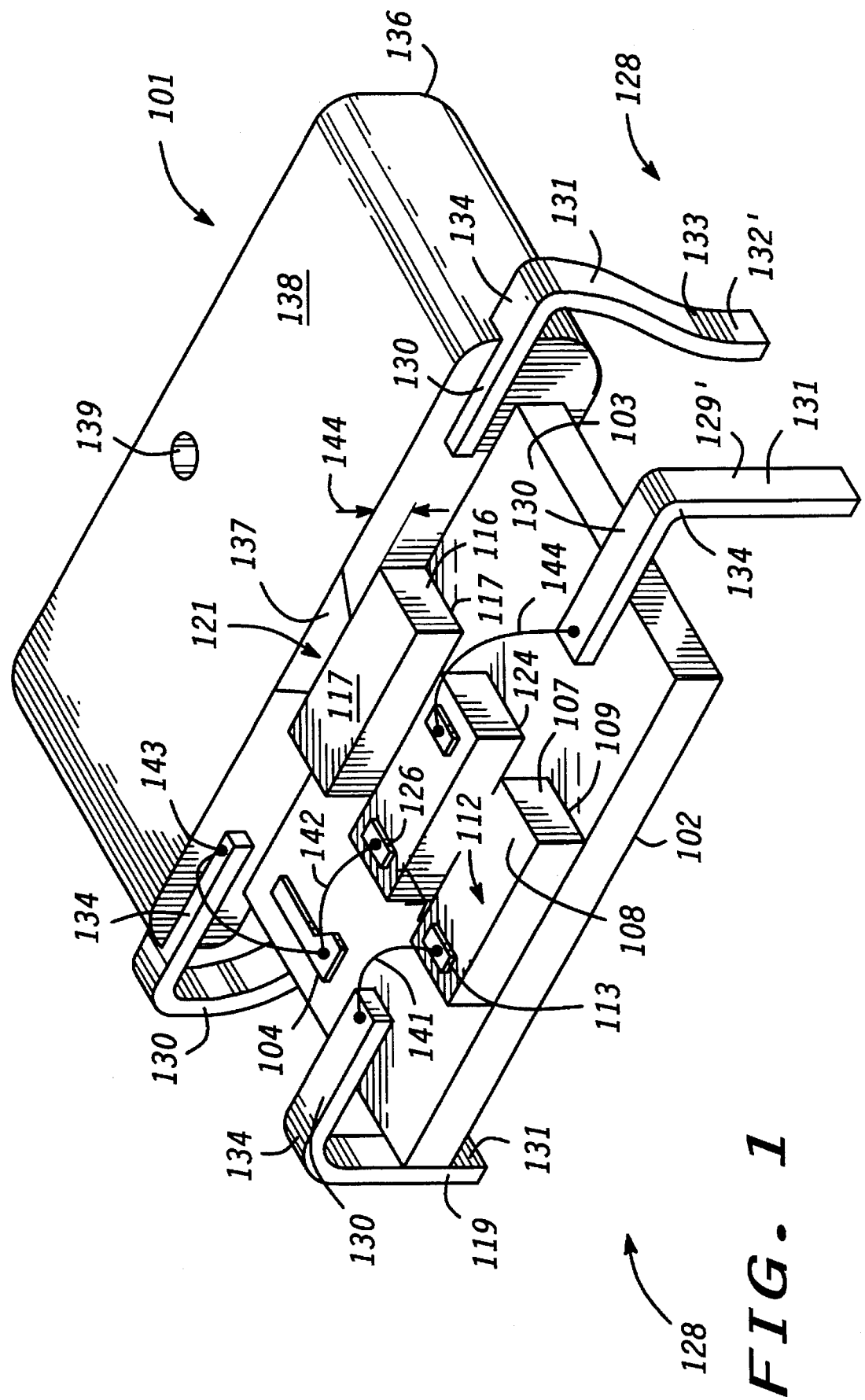
FIG. 1 is an enlarged simplified perspective view of a detachable optical interface unit, with a portion thereof removed.
Figure 2:
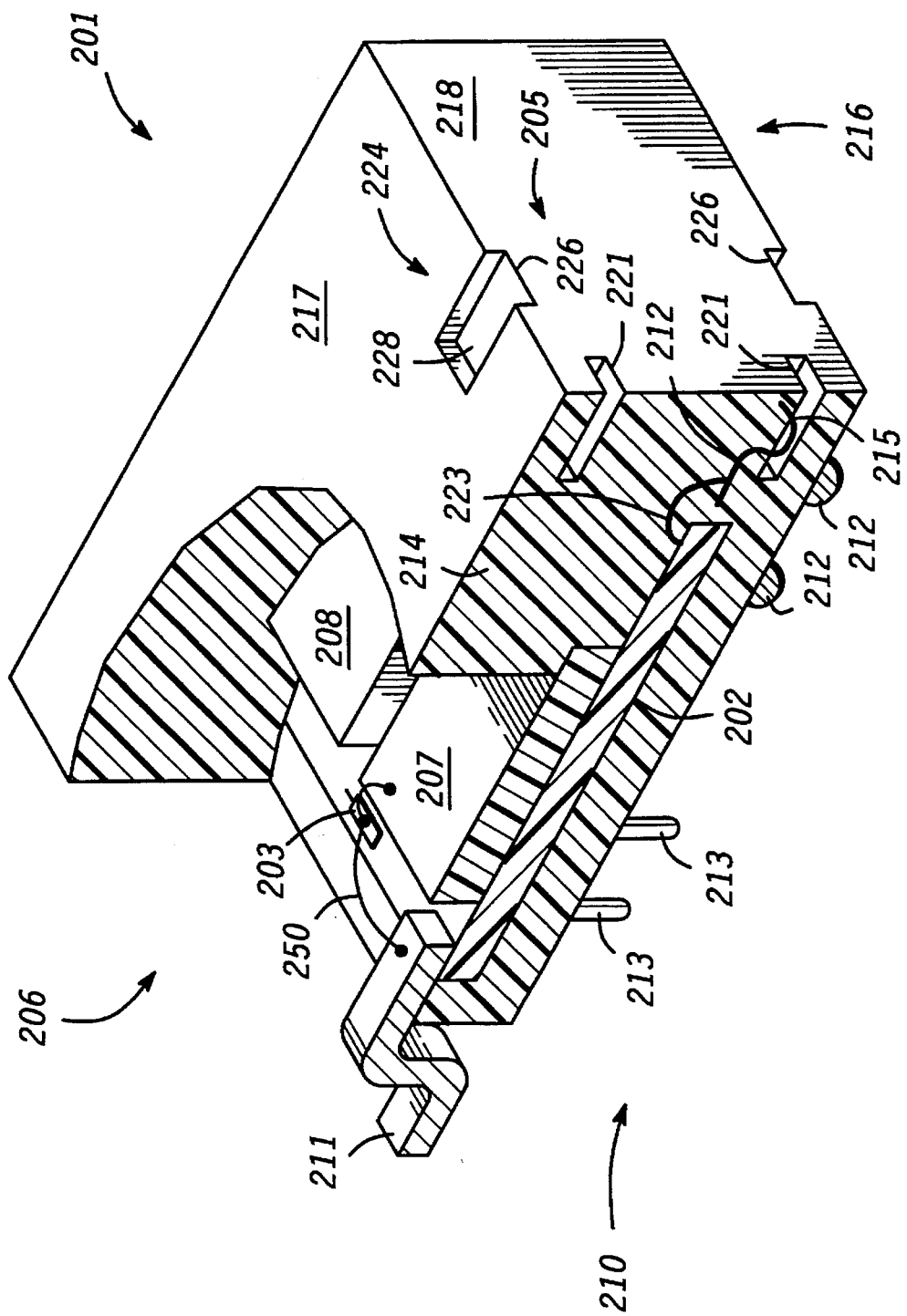
FIG. 2 is an enlarged simplified perspective view of an optical interconnect module, with a portion thereof removed.

FIG. 1 is a greatly enlarged simplified perspective view of a detachable optical interface unit 101 and FIG. 2 is a greatly enlarged simplified perspective view of an interconnect module 201, both with portions thereof removed, thereby illustrating simplified internal workings of both detachable optical interface unit 101 and interconnect module 201, respectively. It should be understood that FIGS. 1 and 2 illustrate only a small portion of detachable optical interface unit 101 and interconnect module 201, thus FIGS. 1 and 2 do not represent any particular size or dimension of detachable optical interface unit 101 or interconnect module 201. Additionally, it should be further understood that FIG. 1 has been greatly simplified in order to better illustrate the present invention.

Referring now to FIG. 1, detachable optical interface unit 101 includes several major elements, such as photonic devices 107 and 116, electrical leads 128, a substrate 102 having a surface 103, an optical portion 136 having a surface 138, and an alignment guide 139. In the present invention, a novel combination of elements or features are used to make or manufacture detachable optical interface unit 101.

Generally, substrate 102 is any suitable substrate, such as a flag of a lead frame, a ceramic interconnect substrate, an FR4 board, a printed circuit board (PCB), or the like. Selection of substrate 102 is application specific; however, depending upon the specific selection of substrate 102, a variety of different electrical interconnections are possible.

For example, by selecting and using the ceramic interconnect substrate, the FR4 board, or the PCB, substrate 102 is enabled to have a plurality of electrical traces, illustrated by electrical trace and bonding pad 104, to be disposed on surface 103 of substrate 102, thus enabling electrical interconnections and electrical signals to travel to various photonic devices and standard electronic components through the plurality of electrical traces 104 mounted on substrate 102. However, if a flag of a lead frame is used as substrate 102, then having the plurality of electrical traces disposed on the flag generally is not possible.

Photonic devices 107 and 116 having working portions 112 and 121, respectively, are mounted on substrate 102 and operably connected to leads 128 using any suitable method, such as TAB, conductive bumps, wire bonding, soldering, or the like. Generally, photonic devices 107 and 116 are either phototransmitters or photoreceivers, or a combination thereof. More specifically, if photonic devices 107 and 116 are phototransmitters, any suitable phototransmitter such as a laser (e.g. vertical cavity surface emitting laser), a light emitting diode, or the like is used. If photonic devices 107 and 116 are photoreceivers, any suitable photoreceiver, such as a photodiode, a PIN photodiode, or the like is used. Also, it should be understood that photonic devices 107 and 116 are capable of being arranged to form an array having phototransmitters, photoreceivers, or a combination of both phototransmitters and photoreceivers. Additionally, in a preferred embodiment of the present invention, when phototransmitting devices and photoreceiving devices are required, the phototransmitting devices are vertical cavity surface emitting lasers (VCSEL) and photoreceiving devices are P-I-N photodiodes.

An integrated circuit (IC) 124 is mounted on substrate 102, thus illustrating a capability of mounting standard electronic components, such as capacitors, resistors, logic devices, amplifiers, and the like on substrate 102 by any suitable method, such as TAB conductive bumps, wire bonding, soldering, or the like. However, it should be understood by those skilled in the art, that selection of these standard electronic components is application specific and will vary from application to application. For example, when IC 124 has been selected and mounted to substrate 102, integrated circuit 124 processes electrical signals either going to or coming from photonic devices 107 and 116 or electrical signals going to or coming from electrical leads 128. Additionally, it should be understood that electrical signals processed by integrated circuit 124 or the like generally are routed through substrate 102 having the plurality of electrical traces 104, thus enabling the electrical signals to be routed to a variety of places throughout substrate 102, as well as to other integrated circuits (not shown), photonic devices 107 or 116, or leads 128.

By way of example, with photonic device 116 being a photoreceiver and with integrated circuit 124 being a receiver chip, light signals (not shown) are converted into electrical signals by working portion 121 of photonic device 116. The electrical signals generated by photonic device 116 are routed to integrated circuit 124 and are subsequently processed by integrated circuit 124. Typically, processing of electrical signals by integrated circuit 124 enables the electrical signals to be manipulated with a variety of functions such as signal enhancement, smoothing, detection, amplification, or the like. Once the electrical signals have been manipulated or processed, integrated circuit 124 sends the manipulated electrical signals to any suitable lead of electrical leads 128, thus the manipulated electrical signals are allowed to exit detachable optical interface unit 101. It should be understood that the manipulated electrical signals are capable of also being sent to other standard electronic components for further processing and to other photonic devices, or the like. Additionally, it should be further understood that while the example given above exemplifies use of a photoreceiver, it is also possible to substitute a phototransmitter for the photoreceiver.

Electrical leads 128 illustrate a portion of a plurality of leads which typically are connected to a lead frame (not shown). The plurality of leads generally are attached to the lead frame so as to facilitate several processes, such as handling, interconnection, and forming. Typically, the standard electrical components and photonic devices 107 and 116 are mounted on substrate 102. All required electrical interconnections are subsequently made to, e.g., to the standard electrical components, to substrate 102, to electrical leads 128, to electrical traces 104, and the like. Once the required electrical interconnections have been completed, optical portion 136 is molded or formed. Finally, electrical 128 are trimmed and formed to their finished shape. The plurality of leads generally are arranged around substrate 102, as well as being operably coupled to the inner workings of detachable optical interface unit 101. Leads 128 are made of any suitable electrically conductive material, such as metals, metal alloys and the like. Generally, electrical leads 128 are fabricated having several portions 130 and 131 with a bend 134 therebetween. Portions 130 are made and positioned in such manner that an operable electrical connection is made between portions 130 and the inner workings of detachable optical interface unit 101, thereby enabling electrical signals to pass to and from detachable optical interface unit 101 into and out of portion 130 of electrical leads 128. Bend 134 typically is set at any suitable angle, thereby generating a portion 131 extending away from bend 134. Additionally, it should be understood that bend 134 is capable of being made in either direction so as to direct portions 131 to any desired direction and at any angle.

With reference to portions 130 of both leads 129, 129' and leads 132, 132' some of portions 130 are illustrated as being operably connected to the inner workings of detachable optical interface unit 101. Portions 130 are operably connected to the inner workings of detachable optical interface unit 101 by any suitable method, such as TAB bonding, wire bonding, conductive bump bonding, and the like. Further, for the sake simplicity of illustration, wire bonds 141, 142, 143, and 144 are used to illustrate the operable electrical connections to and within detachable optical interface unit 101.

Referring now to leads 129 and 129', lead 129 is illustrated as having wire bond 141 operably connected to photonic device 107, thus enabling direct input and output to photonic device 107 from lead 129 having wire bond 141. Second, lead 132 is illustrated as having wire bond 143 operably connected to the plurality of electrical traces 104 on substrate 102, thus enabling electrical connection to several photonic devices and standard electrical components. Third, lead 129' is illustrated as having wire bond 144 operably connected to IC 124, thus enabling direct input and output to and from IC 124 and lead 129' having wire bond 144.

An assembly is formed by making all necessary interconnections between leads 128, substrate 102, photonic devices 107 and 116, and IC 124 or the standard electronic components. The assembly is subsequently placed into a molding system or machine (not shown) and overmolded with the selected or desired molding compound, thereby encapsulating portions of the assembly and forming molded optical portion 136.

Molded optical portion 136 of detachable optical interface unit 101 generally is made of a hard optically transparent molding material, such as polymers, plastics, epoxies, or the like. Typically, the molding material chosen for making molded optical portion 136 is selected to have a refractive index ranging from 1.4 to 1.7. However, it should be understood by one of ordinary skill in the art that selection of specific molding material having a suitable refractive index is dependent upon a wavelength of light that is chosen to pass through molded optical portion 136 to and from photonic devices 107 and 116.

Further, it should be understood that a waveguide 137 is sometimes incorporated in molded optical portion 136 to further enhance performance of detachable optical interface unit 101. However, it should be understood that waveguide 137 is not necessary for operation of detachable optical interface unit 101 in the present invention. Generally, distance 144 ranges between 1.0 millimeter to 10.0 millimeters, thereby allowing more than sufficient process capability for molding of molded optical portion 136.

Alignment guide 139 is formed or made by any suitable method, such as precision drilling, molding, laser ablating, or the like. However, in a preferred embodiment of the present invention, alignment guide 139 is made simultaneously with the molding of molded optical portion 136, thereby insuring correct placement of alignment guide 139 in relation to substrate 102. Generally, alignment guide 139 is formed to any suitable shape or configuration, such as ferrules, pins, openings or the like. In a preferred embodiment of the present invention, alignment guide 139 is molded with molded optical portion 136, thereby lowering cost of manufacturing while improving quality.

Referring now to both FIGS. 1 and 2, with reference to portions 131 of leads 129, 129' and 132, 132', leads 129, 129' and 132, 132' are shaped or formed to any appropriate shape or configuration so that portions 131 of leads 129, 129' are able to be operably connected to interconnect module 201. Generally, as previously described, portions 131 of leads 128 are shaped and trimmed after the overmolding process used for making optical portion 136 has been completed. With reference to portions 131 of leads 128, leads 128 are shaped with any suitable shape of configuration, such as J-leads, tapering leads, curved leads, or the like so as to enhance connectability of detachable optical interface unit 101 to interconnect module 201.

In the case of leads 129 and 129', portions 131 are shaped having a slight taper. In the case of leads 132 and 132', portions 131 are formed with arcs or curves 133 (one of which is clearly shown), thus forming curves or arcs 133 that act as a spring clasp mechanism or clip mechanism between the two curves or arcs 133. Additionally, it should be understood that while only two embodiments are shown in FIG. 1 many other configurations of leads 128 are capable of being used in the present invention.

Referring now specifically to FIG. 2, interconnect module 201 includes several major features or elements, such as an interconnect substrate 202 having a plurality of electrical traces 203 illustrated by a bonding pad and an electrical trace, standard electronic components (illustrated by ICs 207 and 208) mounted thereon, electrical leads 210, and a molded portion 217 having a surface 218, an electrical interface connection (indicated by arrow 214) between the inner workings of interconnect module 201, and a plurality of contacts 205. In the present invention a novel combination of elements or features are used to make or manufacture interconnect module 201.

Interconnect substrate 202 is made of any suitable interconnect, substrate, such as a PCB, a ceramic interconnect board, an FR4 board, or the like having the plurality of electrical traces 203 suitably disposed thereon. The plurality of electrical traces 203 are routed throughout interconnect substrate 202, thereby providing electrical interconnections, conductive paths, and bonding pads for mounting of the standard electronic components thereon. The standard electronic components include IC's 207 and 208, resistors, capacitors, amplifiers, and the like. Mounting of the standard electronic components on interconnect substrate 202 is achieved by any suitable method, such as conductive bumps, tabs, soldering, or the like. Additionally, mounting of the standard electronic components typically is achieve by an automated system (not shown), such as a robot, a robotic arm, or the like.

Electrical leads 210 are made by any suitable method to any suitable form, such as a lead frame member 211, pins 213, conductive bumps 212, and the like, thus providing a path for electrical signals to be able to be inputted and to be outputted from the inner workings of interconnect module 201. By way of example only, lead frame member 211 is operably connected to the plurality of electrical traces 203 through wire bond 250, thus enabling input and output of electrical signals to enter and to exit the inner workings of interconnect module 201 through electrical leads 210.

Referring now to both FIGS. 1 and 2, electrical interface connection 214 enables interconnect module 201 to be operably connected to detachable optical interface unit 101. Electrical interface connection 214 is a combination of several elements or features that enable electrical signals to pass between interconnect module 201 and detachable optical interface unit 101. Generally, electrical interface connection 214 includes a plurality of contacts 205 and a method for interconnecting the plurality of contacts 205 to the inner workings of interconnect module 201. It should be understood that the plurality of contacts 205 illustrated in FIG. 2 have been greatly simplified and that specific engineering details have been purposefully omitted, thus more clearly illustrating the present invention.

The plurality of contacts 205 are made of any suitable conductive material, such as a metal, a metal alloy, or the like. Also, the plurality of contacts 205 are made in any suitable configuration or form that enables electrical contact between leads 128 of detachable optical interface unit 101 and the plurality of contacts 205 of interface module 201.

For example, contact 222 is made of a metal material that is both malleable and resilient. Contact 222 is formed in such a manner that a portion 215 is positioned to make electromechanical contact with one lead of leads 129 of detachable optical interface unit 101 that is frictionally engaged with portion 215, thus electrically and mechanically interconnecting portion 131 with the one lead of leads 128 to contact 222. In yet another example, contact 224 is made of a metal material having a surface 228 that is exposed, thus enabling portions 131 of leads 132 to make electromechanical contact with surface 228 of contact 224. It should be understood that both contacts 222 and 224 are able to be made as prefabricated structures, such as sockets, arrays, or the like.

The plurality of contacts 205 are operably coupled to the inner workings of interconnect module 201 by any suitable means, such as tab bonding, wire bonding, or the like. However, in this specific example, wire bond 223 is used to illustrate interconnection between the plurality of contacts 205 to interconnect substrate 202, thus enabling electrical signals to pass to and from the inner workings of interconnect module 201 to at least one contact of contacts 222.

Molded portion 216 is formed around interconnect substrate 202 and its associated parts. Generally, molded portion 216 is made of any suitable molding material, such as plastics, polyimides, epoxies, or the like. It should be understood that molding material used for molded portion 216 does not have to be of any particular refractive index. Further, it should be understood that the processes for forming molded portion 216 are well known in the art. Molded portion 216 forms a first surface or major surface 217 and an end surface 218. However, end surface 218 and surface 217 are made having several portions removed to make openings 221 and 226 such as slots or groove, respectively, thereby exposing contacts 222 and 224. It should be understood, in a preferred embodiment of the present invention, that the portions removed from end surface 218 and surface 217 would generally be of a single configuration, i.e., contacts 222 and 224 would be of a single design. However, similarities in configuration are a matter of design choice and do not affect the operability of the present invention.

In the case of openings 221, openings 221 are formed by any suitable method, such as molding, precision milling, laser ablating, or prefabricated and overmolded, or the like. Generally, openings 221 allow access to contact 222 with electrical connection to the inner working of interconnect substrate 202 by wire bond 223. However, in a preferred embodiment of the present invention, prefab sockets having openings 221 that incorporate contact 222 are used. These prefab sockets are positioned and operably coupled to interconnect substrate 202 and are subsequently overmolded by molded portion 216.

In the case of openings 226, openings 226 are made with any suitable method, such as molding, laser ablating, precision milling, or the like. Generally, formation of openings 226 expose surface 228 of contact 224 that is operably connected to interconnect substrate 202 in a similar fashion as described hereinbefore.

Figure 3:
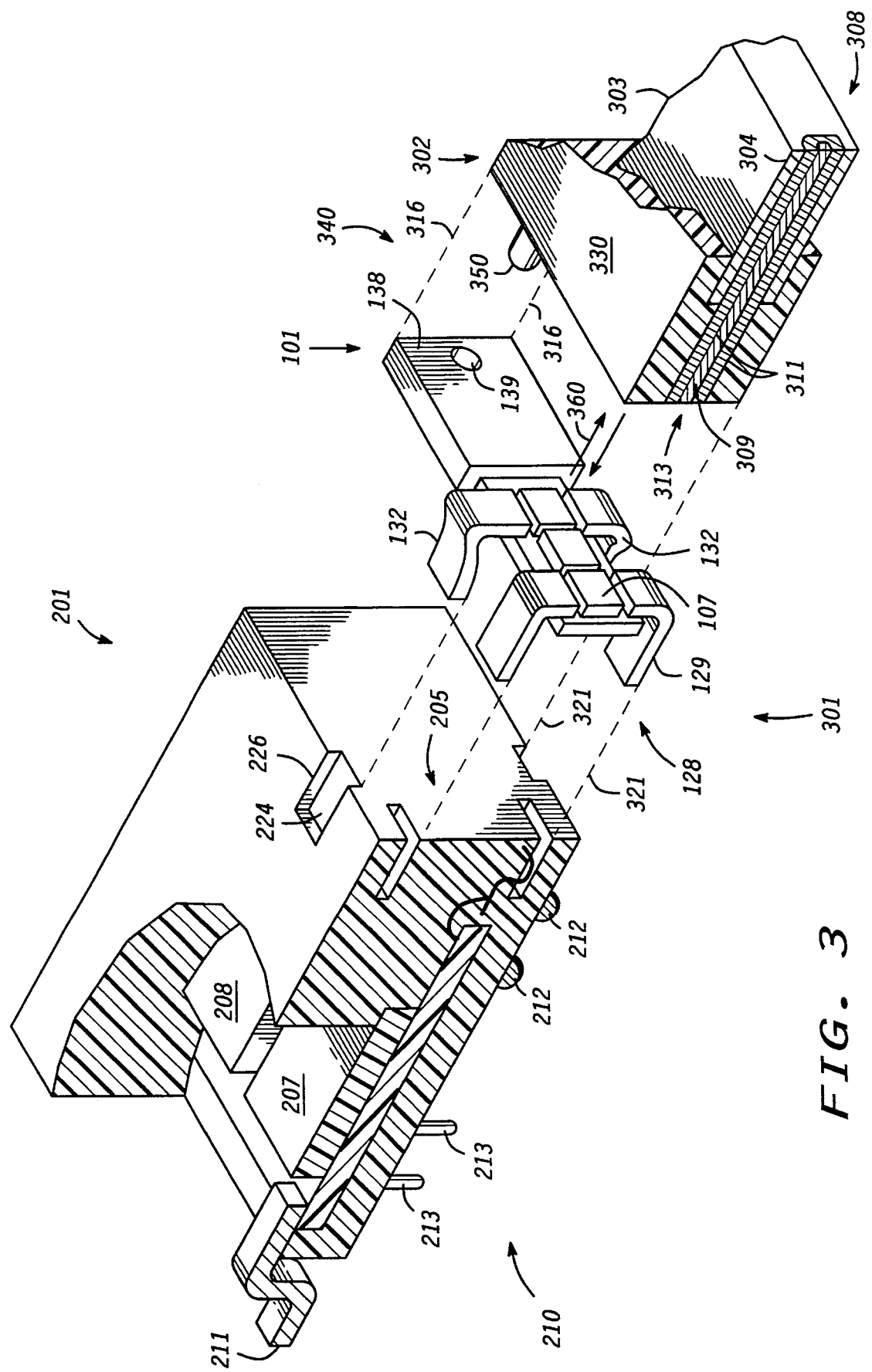
FIG. 3 is an enlarged simplified perspective view of an optical interconnect incorporating the present invention, system with a portion thereof removed.

FIG. 3 is an optical interconnect system 301 with portions thereof removed, thereby illustrating a sectional view of optical interconnect system 301. It should be understood that previously described elements, i.e., detachable optical interface unit 101 and interconnect module 201 will retain their original identifying numerals.

Optical connector 302 is made with an optical cable 303 and a body 330. Optical cable 303 includes several features, such as a sheath 304, an optical fiber 308 having a core region 309 and a cladding region 311. During manufacturing of optical connector 302, optical cable 303 is cleaved or cut such that a cross-section of optical fiber 308 is exposed. The exposed cross-section of optical fiber 308 is positioned and formed within body 330 such that the cross section is positioned at an optical coupling surface 313, thus enabling optical coupling of optical fiber 308 to photonic devices 107 or 116 through molded optical portion 136.

Alignment of optical fiber 308 to photonic device 113 is achieved by an alignment guide system 340 which includes alignment guides 139 and 350. Alignment guide 350 is similar to (mates with) alignment guide 139, thus not requiring a detailed description. However, it should be understood that alignment guides 139 and 350 cooperatively interact so as to align optical connector 302 to detachable optical interface unit 101.

In function, optical connector 302 is removably attached to detachable optical interface unit 101, indicated by dotted lines 316, to bring optical coupling surface 313 of optical connector 302 against surface 138 of detachable optical interface unit 101, thus operably coupling optical fiber 308 to photonic device 107. Further, detachable optical interface unit 101 is removably attached to interface module 201, indicated by dotted lines 321, to bring leads 128 into electromechanical contact with contacts 205, thus operably connecting interconnect module 201 to detachable optical interface unit 101 by leads 128 and operably connecting interconnet module 201 to optical connector 302. Moreover, light signals, indicated by arrows 360, are coupled to photonic devices 107 and 116 of detachable optical interface unit 101 which is coupled to interconnect module 201.

Making optical interconnect system 301 in a modular form allows for quick and easy removal, as well as quick and easy replacement of detachable optical interface unit 101 from both optical connector 302 and interconnect module 201.

Additionally, optical interconnect system 301 is easily configured or changed to be an optical repeater by providing an appropriately configured detachable optical interface unit 101. For example, with detachable optical interface unit 101 being able to receive and transmit light signals, the receiving photonic device converts the light signals to electrical signals that are enhanced or amplified by the standard electronic components that are contained in detachable optical interface unit 101 or interconnect module 201. The amplified electrical signals are subsequently routed to a transmitting photonic device of detachable optical interface unit 101 that converts the amplified electrical signals to light signals. The light signals are guided into another optical fiber.

FIG. 4 is an enlarged simplified partially exploded perspective view of another optical interconnect system 400 with a portions thereof removed. It should be understood that similar or identical features illustrated in FIGS. 1–3 will retain there original identifying numerals. It should be further understood that FIG. 4 is greatly simplified, thus purposefully omitting engineering details in order to provide greater clarity to the present invention.

Optical connector 302 and detachable optical interface unit 101 have been previously described in detail in FIGS. 1 and 3, thus obviating the need to describe detachable optical interface unit 101 and optical connector 302 in FIG. 4. However, it should be pointed out that detachable optical interface unit 101 differs slightly from the previous description in that leads 129 are bent in an opposite direction.

Referring to FIG. 4, an interconnect module 401 is illustrated that is greatly enlarged and partially exploded, thereby illustrating some internal workings of interconnect module 401. Interconnect module 401 includes many similar features and elements of interconnect module 201 illustrated in FIG. 2, such as interconnect substrate 202, the plurality of electrical tracings 203, standard electronic components (illustrated by 207 and 208), molded portions 216 that are illustrated as two portions, and electrical leads 210 that are illustrated as electrical lead 211. However, in this particular embodiment of the present invention, a waveguide 402 is mounted on interconnect substrate 202. In a preferred embodiment of the present invention, waveguide 402 is molded. Waveguide 402 includes end surfaces 430 and 431, core regions 407 that are surrounded by a cladding region 408, conductive pathways or lead frame members 403 and 404, contacts 422 and 428, and alignment guides 409 and 410.

Generally, waveguide 402 is made in accordance with the teachings of copending application bearing Ser. No. 07/889,335, entitled MOLDED WAVEGUIDE AND METHOD OF MAKING SAME, filed on May 28, 1992, which is hereby incorporated by reference herein, and by copending application bearing Ser. No. 07/889,335, entitled MOLDED WAVEGUIDE WITH UNITARY CLADDING REGION, filed on Feb. 19, 1993, U.S. Pat. No. 5,265,184 which is hereby referenced. Additionally, molded waveguide 402 is made with conductive pathways or lead frame members 403 and 404 such that an electrical connection is made between contacts 422 and 428, thus enabling an electrical connection between contacts 422 and 428 to the plurality of electrical tracings 203 of interconnect substrate 202.

Alignment guides 409 and 410, are located on both end surfaces 430 and 431, respectively, of molded waveguide 402. Structural detail of alignment guide 409 and 410 have been previously described with reference to alignment guide system 340 of FIG. 3.

In function, optical connector 302 is removably attached to interconnect module 401, indicated by dotted lines 421, to bring optical coupling surface 313 of optical connector 302 against end surface 430 of waveguide 402, thus operably coupling optical fiber 308 to a core region of core regions

407. Further, interconnect module 401 is removably attached to detachable optical interface unit 101, indicated by dotted lines 423, thus operably connecting interconnect module 401 to detachable optical interface unit 101 by leads 128, as well as operably connecting interconnect module 401 to optical connector 302. Moreover, light signals, indicated by arrows 460, are coupled to photonic devices 107 and 116 of detachable optical interface unit 101 through core regions 407 of waveguide 402 that is coupled to interconnect module 401.

Additionally, optical interconnect system 400 is easily configured or changed to be an optical repeater by providing an appropriately configured detachable optical interface unit 101. For example, with detachable optical interface unit 101 being able to receive and transmit light signals, light signals 460 from optical core region 309 Of optical fiber 308 are guided in a core of core regions 407. The core region further guides light signals to a receiving photonic device mounted on detachable optical interface unit 101. The receiving photonic device converts the light signals to electrical signals that are enhanced or amplified by the standard electronic components that are contained in detachable optical interface unit 101 or interconnect module 401. The amplified electrical signals are subsequently routed to a transmitting photonic device of detachable optical interface unit 101 that converts the amplified electrical signals to light signals. The light signals are guided into another core region of core regions 407 that guides the light signal to another optical fiber.

Use of conventional methods for manufacturing optical interface devices does not provide sufficient flexibility for modular manufacturing of optical interface devices, thus increased use of optical interface devices is difficult to be assimilated with and into standard electronic circuits and electronic components. As a result of this difficulty, use of conventional methods for manufacturing optical interface devices limit their use for interconnection applications in standard electronic equipment. Thus, use of standard or conventional optical interface devices in high volume applications is severely curtailed.

By now it should be appreciated that a novel method for making a detachable optical interconnect unit and optical interconnect module have been described. The detachable optical interconnect unit allows for quick and efficient placement of photonic devices in a cost effective manner, thus allowing their usage in optical electronic modules with standard electronic components. Additionally, this method allows for an inexpensive process for combining both standard electronic components and optical components.

We claim:

1. A method for making an interconnect module comprising the steps of:

providing an interconnect substrate having a plurality of electrical traces with standard electronic components mounted and operably connected to the plurality of electrical traces on the interconnect substrate;

connecting an electrical lead to the plurality of electrical traces on the interconnect substrate for inputting and outputting electrical signals to the plurality of electrical traces on the interconnect substrate;

exposing an electrical contact having a surface, the surface of the electrical contact being frictionally detachably affixed to a photonic device to operably couple the photonic device to the electrical contact, as well as the electrical contact being operably connected to the plurality of electrical traces; and forming a molded portion having a surface and an end surface, the molded portion encapsulating the interconnect substrate, the standard electronic components, and a portion of the electrical lead, the end surface having a portion thereof removed, thereby allowing the exposed portion of the electrical contact to be frictionally detachably affixed to the photonic device.

2. A method for making an interconnect module as claimed in claim 1 where, in the step of connecting an electrical lead to the plurality of electrical traces, the connecting is achieved with a lead frame.

3. A method for making an interconnect module as claimed in claim 1 where, in the step of forming a molded portion having a surface and an end surface, the molded portion encapsulating the interconnect substrate, the standard electronic components, and a portion of the electrical lead, the end surface having a portion thereof removed, the forming of the molded portion is achieved by transfer molding.

4. A method for making an interconnect module as claimed in claim 1 where, in the step of forming a molded portion having a surface and an end surface, the molded portion encapsulating the interconnect substrate, the standard electronic components, and a portion of the electrical lead, the end surface having a portion thereof removed, the forming of the molded portion is achieved by injection molding.

5. A method for making an interconnect module as claimed in claim 1 where, in the step of providing an interconnect substrate having a plurality of electrical traces with standard electronic components mounted and operably connected to the plurality of electrical traces on the interconnect substrate, the providing of standard electronic components includes an integrated circuit.

6. A method for making an optical interconnect system comprising the steps of:

forming an optical interconnect module including an interconnect substrate having a plurality of electrical traces, an electrical circuit for electrical signal manipulation operably connected to the interconnect substrate by the plurality of electrical traces, a means for inputting and outputting electrical signals from the interconnect substrate operably connected to the interconnect substrate, a molded portion having a first surface and an end surface that encapsulates the interconnect substrate, the electrical circuit, and a portion of the means for outputting electrical signals, the end surface having a portion removed to expose an electrical contact with the electrical contact being operably connected to the interconnect substrate;

forming a detachable optical interface unit including a substrate, an optoelectronic device having a first surface and a second surface with the first surface having a working portion of the optoelectronic device and the second surface mounted to the substrate, a first electrical lead and a second electrical lead operably connected to the optoelectronic device, the first electrical lead and the second electrical lead extending away from the substrate, the first electrical lead frictionally detachably affixed to the electrical contact; and forming an optical connector having a plurality of optical fibers, an alignment guide, and a coupling surface, wherein the plurality of optical fibers are cross-sectionally exposed on the coupling surface of the optical connector and are operably coupled to the detachable optical interface unit.

\* \* \* \* \*